(12) United States Patent
Kollbeck

(10) Patent No.: US 6,237,503 B1
(45) Date of Patent: May 29, 2001

(54) GARBAGE AND DEBRIS CONVEYING SYSTEM

(76) Inventor: William L. Kollbeck, 35 Jackson, East Islip, NY (US) 11730

( * ) Notice: Subject to any disclaimer, the term of this patent is extended or adjusted under 35 U.S.C. 154(b) by 0 days.

(21) Appl. No.: 09/359,572

(22) Filed: Jul. 22, 1999

(51) Int. Cl.[7] .................................................. B61B 10/00
(52) U.S. Cl. ......................................................... 104/173.1
(58) Field of Search .............................. 104/173.1, 172.3, 104/246, 172.1, 165

(56) References Cited

U.S. PATENT DOCUMENTS

| | | |
|---|---|---|
| 467,346 | 1/1892 | Garland . |
| 474,951 | 5/1892 | Dunne . |
| 943,539 | 12/1909 | Harling . |
| 1,674,293 | 6/1928 | Marx . |
| 1,690,409 | 11/1928 | Heyman . |
| 1,704,012 | 3/1929 | Marx . |
| 1,753,282 | 4/1930 | Berger . |
| 1,777,484 | 10/1930 | Fay et al. . |
| 5,042,642 * | 8/1991 | Ulrich ................................ 104/172.3 |
| 5,096,049 * | 3/1992 | Anderson .......................... 104/172.3 |
| 5,353,887 * | 10/1994 | Putnam ................................. 104/246 |
| 5,445,081 | 8/1995 | Kunczynski . |
| 5,473,991 | 12/1995 | Crum . |
| 5,549,050 * | 8/1996 | Rhodes ............................. 104/172.3 |

* cited by examiner

Primary Examiner—S. Joseph Morano
Assistant Examiner—Robert J. McCarry, Jr.
(74) Attorney, Agent, or Firm—Schmeiser, Olsen & Watts

(57) ABSTRACT

This invention relates generally to a conveying system for moving garbage from a house to a road. A support structure includes interlocking sections that can be interconnected to provide a desired length. A regulating system provides two distance limits for the movement of a garbage container. A connector post including a quick release coupling allows the container to be removed easily from an endless flexible conveyor.

22 Claims, 9 Drawing Sheets

GARBAGE AND DEBRIS CONVEYING SYSTEM

FIELD OF THE INVENTION

The present invention relates generally to conveying devices for moving objects from one location to another. More particularly, the present invention relates to a device for moving a receptacle such as a garbage bin to and from a house and a street.

BACKGROUND OF THE INVENTION

Conveying systems for moving objects are known in the art. The conveying system enables a homeowner to transport trash from his home to a curb-side location without having to carry it. The conveying system especially helps an elderly person or a disabled person to move loaded trash from his home to a street curb location.

Conveying systems typically include a support structure extending from a point near the home to a point near the curb. Commonly, the support structure is a track on which a garbage container can move. The weight of the container is supported by wheels. Many conveying systems typically include an endless conveyor chain. A first end of the endless conveyor chain is generally rotated by a rotary drive pulley. The rotary drive pulley is rotated by a motor. A second end of the endless conveyor chain generally rotates about a rotary idler pulley. The motor is attached to a first end of the support structure and the idler pulley is attached to a second end of the support structure. Commonly, the endless conveyor chain is also attached to a container. Typically, the endless conveyor chain extends longitudinally within the support structure so as to be movable in the space below the container. When the motor is turned on, the motor can drive the endless conveyor chain in a forward or a backward direction. Thus, the container can move with the endless conveyor chain and may carry the trash from the home to the curb.

Conveying systems are typically permanently installed and the length of support structure cannot be easily adjusted. Thus, it can be difficult for a homeowner to relocate the trash loading point.

Additionally, conventional conveying systems do not have a regulating system to control the distance of motion of the container. Furthermore, a conventional conveying system does not have a quick release coupling allowing the container to be easily released.

SUMMARY OF THE INVENTION

The present invention provides a conveying system for moving household trash from a point near a house to a point near a curb so that the homeowner does not have to carry the trash. The conveying system has a support structure that includes a plurality of interlocking mats. The homeowner can change the trash loading location by adding or removing sections of interlocking mats. Additionally, the conveying system includes a regulating system that can provide at least two distance limits for the movement of the container, for example, a first distance limit can stop the container near the house, and a second distance limit can stop the container near the road. Furthermore, the conveying system includes a wireless remote control allowing the homeowner to conveniently operate the motor from inside the house. Additionally, a quick release coupling allows the container to be removed easily from a connector post.

The present invention in one embodiment generally provides an apparatus comprising:

a motor;

a rotary drive pulley operatively coupled to the motor;

a support structure having a first end attached to the motor and a second end attached to an idler member;

an endless flexible conveyor connecting the rotary drive pulley and the idler member;

a first end of a connector post connected to the endless flexible conveyor;

a container for carrying objects removably attached to a second end of the connector post; and a wireless remote control system for activating the motor.

The present invention in another embodiment provides an apparatus comprising:

a motor;

a rotary drive pulley operatively coupled to the motor;

an endless flexible conveyor connecting the rotary drive pulley and an idler member;

a support structure having a first end attached to the motor and a second end attached to the idler member, wherein the support structure further includes a plurality of interlocking mats, with a first longitudinal opening receiving a first portion of the endless flexible conveyor within each mat, and a second longitudinal opening receiving a second portion of the endless flexible conveyor within each mat;

a first end of a connector post connected to the endless flexible conveyor; and a container for carrying objects removably attached to a second end of the connector post.

In another embodiment, the present invention provides an apparatus comprising:

a motor;

a rotary drive pulley operatively coupled to the motor;

a support structure having a first end attached to the motor and a second end attached to an idler member;

an endless flexible conveyor connecting the rotary drive pulley and the idler member; and a connector post having a first end connected to the endless flexible conveyor and a second end including a quick release coupling for attaching a container.

The apparatus further including a regulating system for providing at least two distance limits for the motion of the container.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
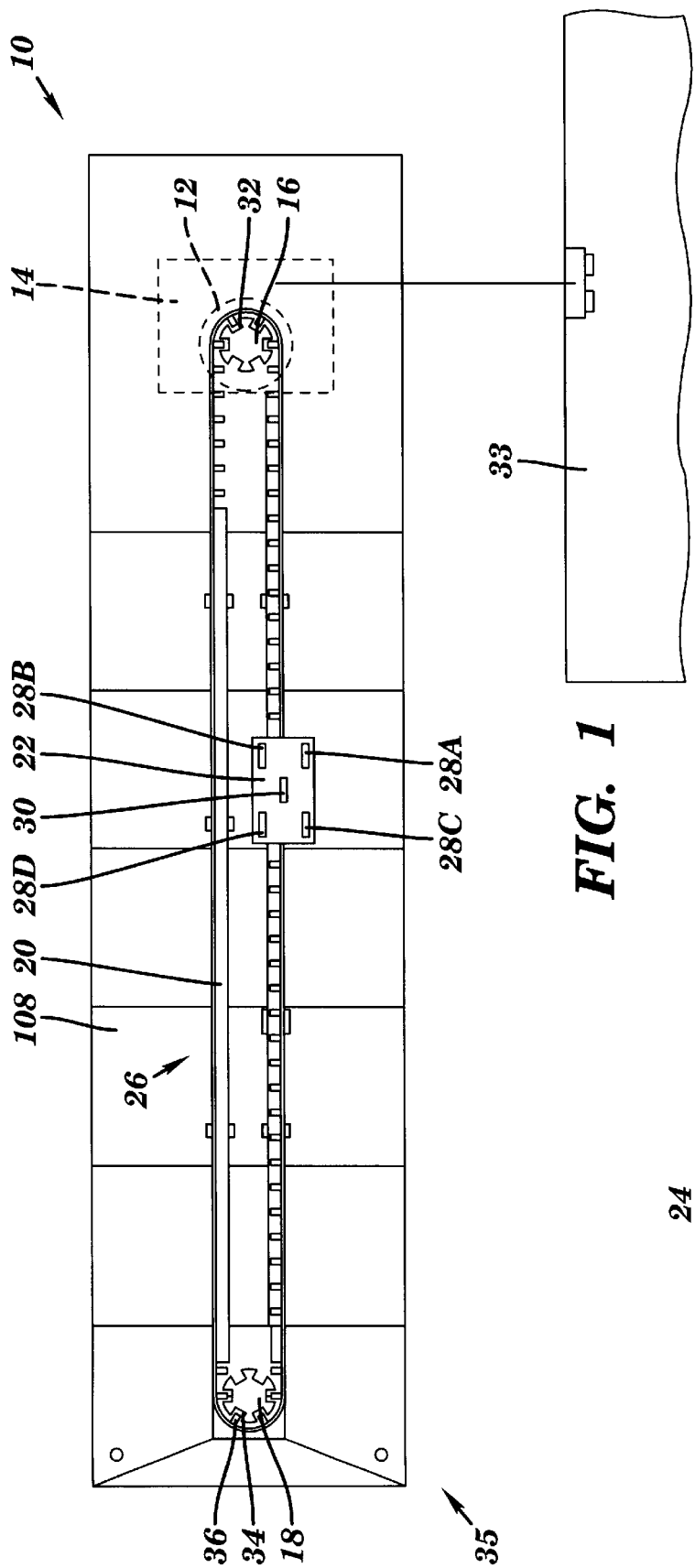
FIG. 1 illustrates a plan view of a conveying system.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Figure 2:
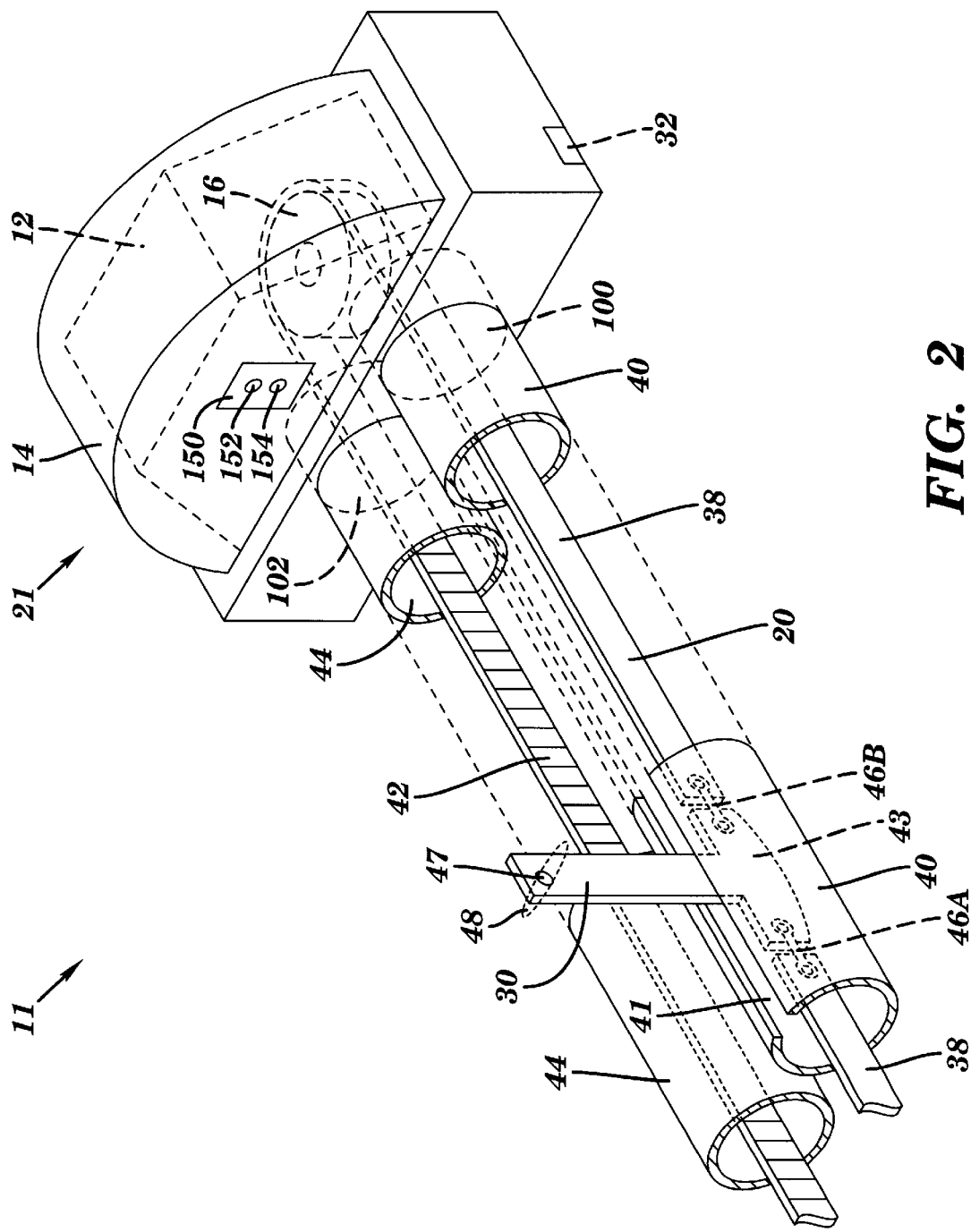
FIG. 2 illustrates a perspective view of a first end of the conveying system that includes a motor and a regulating system.
Figure 3:
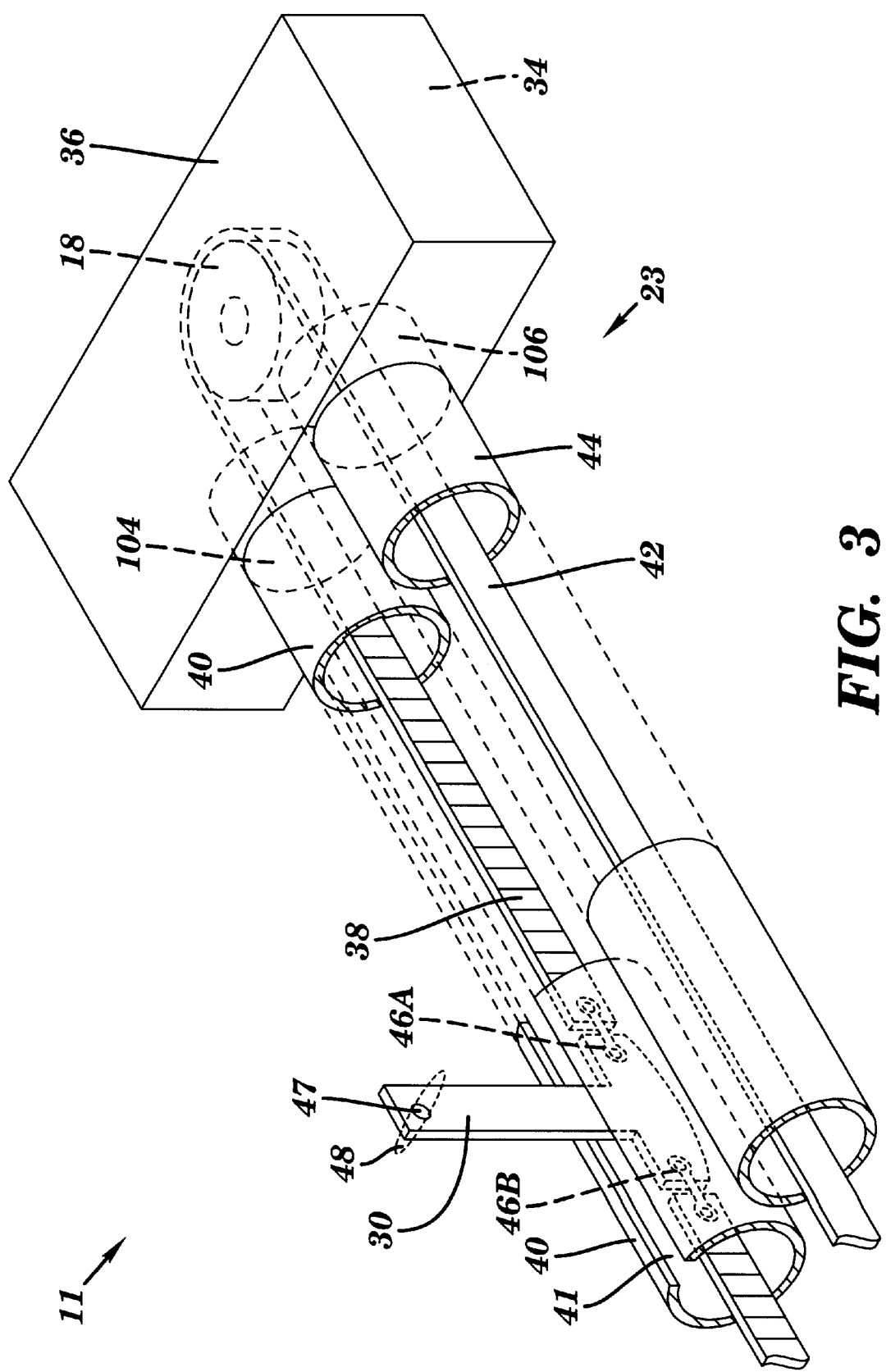
FIG. 3 illustrates a perspective view of a second end of the conveying system that includes a idler pulley.

Referring to FIG. 1, there is illustrated a plan view of a conveying system 10. The conveying system 10 includes a motor 12, a motor housing 14, a rotary drive pulley 16, an idler member 18, an endless flexible conveyor 20, a container 22, a wireless remote control system 24 (FIG. 6), a support structure 26, a plurality of wheels 28A, 28B, 28C and 28D, a connector post 30, a first end 32 of support structure 26 that is near a house 33, a second end 34 of support structure 26, and an idler assembly housing 36. The motor 12 is placed in a motor housing 14 that is located at the first end 32 of the support structure 26. One end of the rotary drive pulley 16 (e.g. sprocket, sheave, etc.) is operatively coupled to the motor 12, and the other end of the rotary drive pulley 16 is attached to the endless flexible conveyor 20 (e.g. chain, cable, nylon rope, positive drive belt, etc.). The endless flexible conveyor 20 is also connected to the idler member 18 (e.g. pulley, sprocket, sheave, etc.). The idler member 18 is located within the idler assembly housing 36 that is attached to the second end 34 of the support structure 26 that is located near a road 35. The container 22 (e.g. box, bin, etc.) is attached to the endless flexible endless conveyor 20 by the connector post 30. The container 22 has wheels 28A, 28B, 28C and 28D for rolling along the support structure 26. The support structure 26 may include a plurality of interlocking mats 50A–50L (FIG. 7). Additionally, the support structure 26 may include a conduit 40 and a conduit 44 (FIGS. 2 and 3). The wireless remote control system 24 can turn on or off the motor 12. The endless flexible conveyor 20 is driven by the motor 12 by the rotary drive pulley 16. The endless flexible conveyor 20 pulls the container 22 by the connector post 30, and the container 22 rolls along the support structure 26 by the wheels 28A, 28B, 28C, and 28D.

FIG. 2 illustrates a perspective view of a first end 21 of a conveying system 11. The first end 21 of the conveying system 11 includes the motor 12, the motor housing 14, a regulating system 150 including a control knob 152 and a control knob 154, a first conduit 40 including a longitudinal slot 41, a first portion 38 of the endless flexible conveyor 20, a second conduit 44, a second portion 42 of the endless flexible conveyor 20, the connector post 30, two connectors 46A and 46B, and a quick release coupling 48. The regulating system 150 is connected to the motor 12. The control knob 152 is rotated to adjust the position where the motor 12 rotation will stop when the connector post reaches a desired location near the first end 21 of the conveying system 11. The control knob 154 is rotated to adjust the position where the motor 12 rotation will stop when the connector post reaches a desired location near a second end 23 of the conveying system 11 (FIG. 3). The first conduit 40 attaches to the housing 14 and surrounds an opening 100 in the housing 14. The second conduit 44 attaches to the housing 14 and surrounds an opening 102 in the housing 14. The first portion 38 of the endless flexible conveyor 20 is connected to the rotary drive pulley 16 and is located in the first conduit 40 below the longitudinal slot 41. A first end 43 of the connector post 30 is connected to the first portion 38 of the endless flexible conveyor 20 by the connectors 46A and 46B. A second end 45 of the connector post 30 includes a hole 47 to which a quick release coupling 48 can be attached. The quick release coupling 48 (shown in phantom) allows the container 22 to be removably attached to the connector post 30. The connector post 30 slides along the longitudinal slot 41 of the first conduit 40. The quick release coupling 48 can include a connector (e.g., pin, clip, cotter pin, etc.).

FIG. 3 illustrates a perspective view of a second end 23 of the conveying system 11. The second end 23 of the conveying system 11 includes the idler member 18, the idler assembly housing 36, the first conduit 40 including the longitudinal slot 41, the first portion 38 of the endless flexible conveyor 20, the second conduit 44, the second portion 42 of the endless flexible conveyor 20, the connector post 30, the connectors 46A and 46B, and the quick release coupling 48. The first conduit 40 attaches to the idler assembly housing 36 and surrounds an opening 104 in the idler assembly housing 36. The second conduit 44 attaches to the idler assembly housing 36 and surrounds an opening 106 in the idler assembly housing 36. The endless flexible conveyor 20 wraps around the idler member 18. The idler member 18 may be, for example, a pulley, a sprocket etc. The endless flexible conveyor 20 can include, for example, a cable, rope, belt, positive drive belt, etc.

Figure 4:
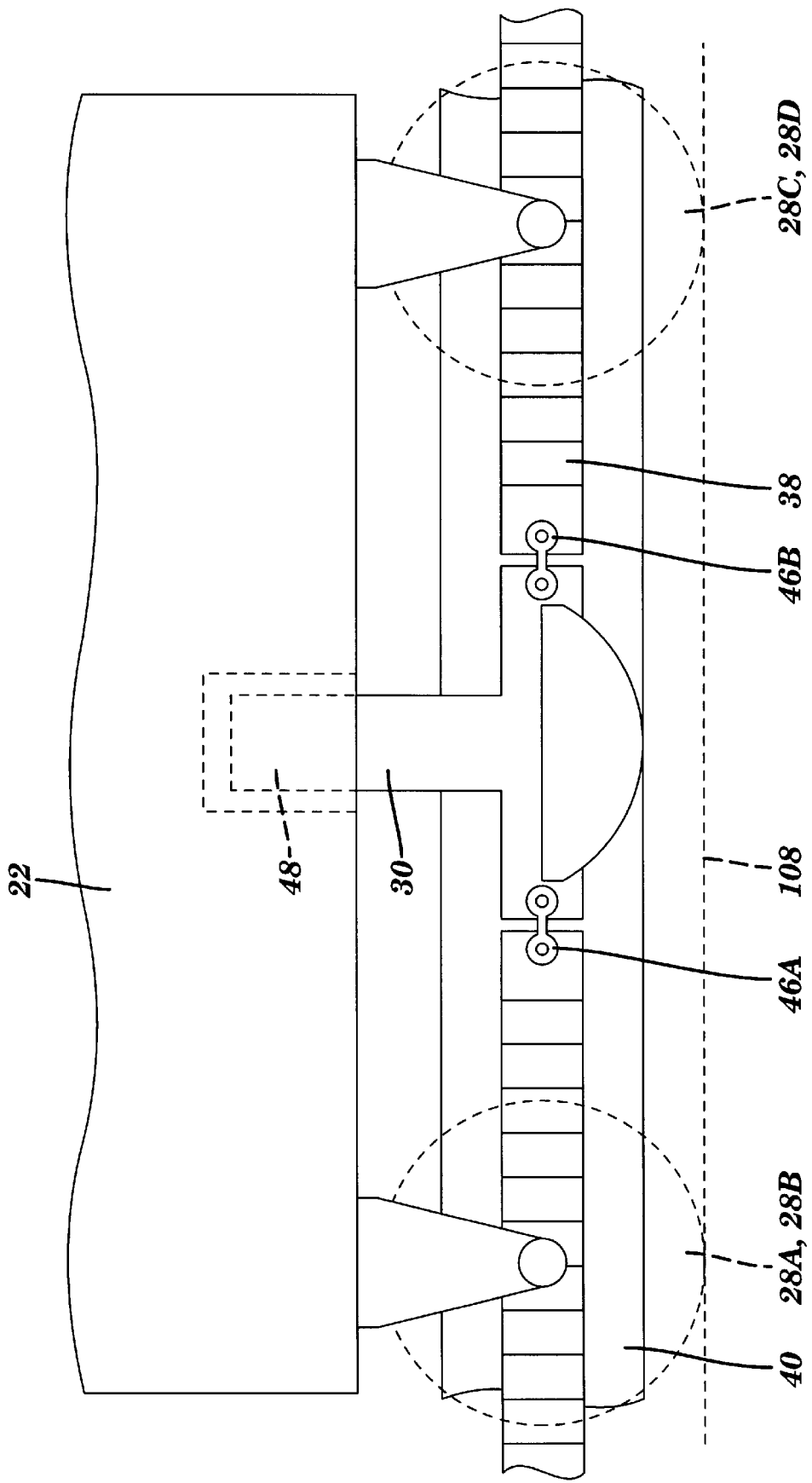
FIG. 4 illustrates a partial cross-sectional side view of a container attached to an endless flexible conveyor by a connector post.

FIG. 4 illustrates a partial cross-sectional side view of the container 22 attached to the endless flexible conveyor 20 by the connector post 30. The container 22 is removably attached to the connector post 30 by the quick release coupling 48. Thus, the container 22 can be easily released from the connector post 30. The container 22 also includes wheels 28A, 28B, 28C and 28D for rolling along on a top surface 108 of the support structure 26.

Figure 5:
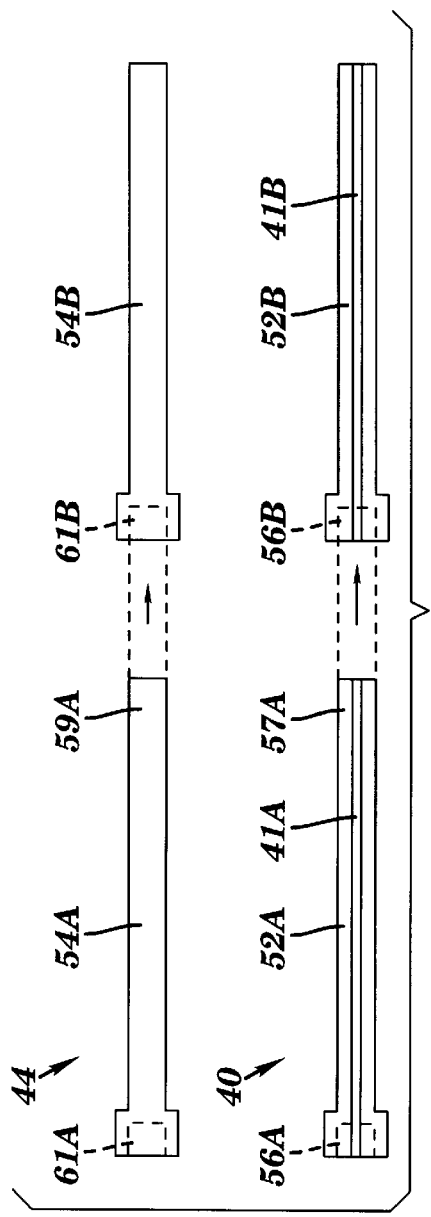
FIG. 5 illustrates a plan view of a plurality of pipe sections.

FIG. 5 illustrates another embodiment of the first conduit 40 including pipe sections 52A and 52B, and the second conduit 44 including pipe sections 54A and 54B. The pipe sections 52A and 52B include longitudinal slots 41A and 41B, respectively.

The pipe sections 52A and 52B include heads 56A and 56B respectively. A plurality of pipe sections 52 can be interconnected to form a desired total length of the first conduit 40. For example, pipe sections 52A and 52B can be interconnected by pressing a first end 57A of the pipe section 52A into the head 56B. Additional pipe sections 52 (not shown) may be added to form the first conduit 40. The longitudinal slots 41A and 41B are aligned to form one continuous slot 41.

A plurality of pipe sections 54 can be interconnected to form a desired total length of the second conduit 44. The pipe sections 54A and 54B include heads 61A and 61B, respectively. A plurality of pipe sections 54 can be interconnected to form a desired total length of the second conduit 44. For example, pipe sections 54A and 54B can be interconnected by pressing a first end 59A of the pipe section 54A into the head 61B. Additional pipe section 54 (not shown) may be added to form the second conduit 44.

Figure 6:
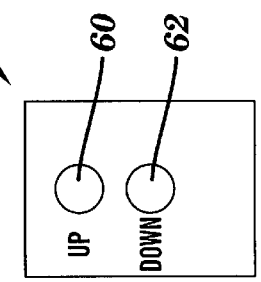
FIG. 6 illustrates a plan view of a wireless remote control.
Figure 7:
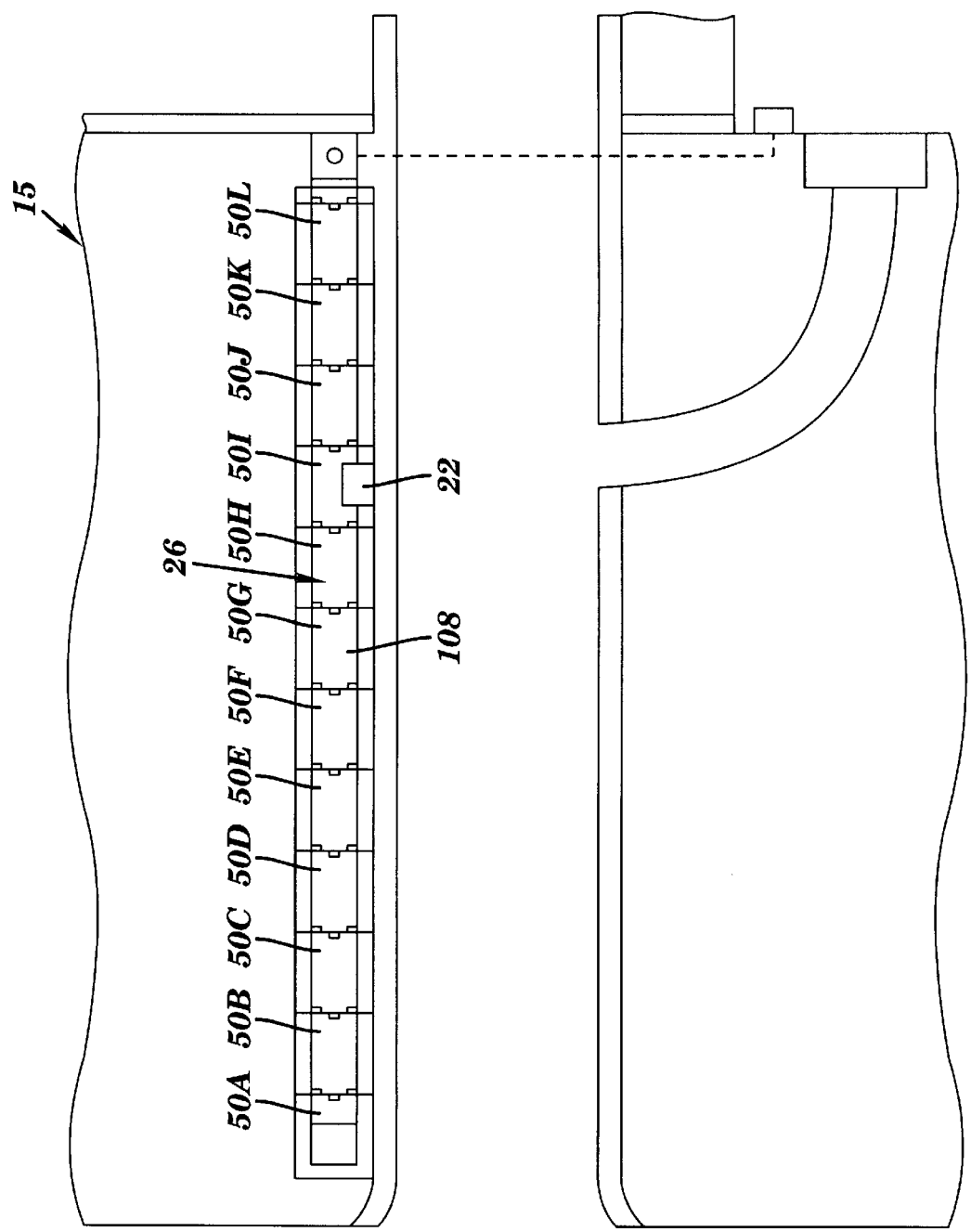
FIG. 7 illustrates a plan view of another conveying system embodiment including a plurality of interlocking mats.

FIG. 6 illustrates a plan view of the wireless remote control 24. The wireless remote control 24 has an "up" button 60 and a "down" button 62 for controlling the motor 12. When the "up" button 60 is pushed, the motor 12 and the rotary drive pulley 16 rotate in a clockwise direction causing the endless flexible conveyor 20 to rotate in a clockwise direction. Thus, the container 22 is driven by the endless flexible conveyor 20 toward the road 35 (FIG. 1). When the "down" button 62 is pushed, the motor 12 and the rotary drive pulley 16 rotates in a counter-clockwise direction causing the endless flexible conveyor 20 to rotate in a counter-clockwise direction. Thus, the container 22 is driven by the endless flexible conveyor 20 toward the house 33.

FIG. 7 illustrates a plan view of another embodiment of a conveying system 15 including the container 22 and the support structure 26. The support structure 26 includes a plurality of interlocking mats 50A, 50B, 50C, 50D, 50E, 50F, 50G, 50H, 50I, 50J, 50K and 50L. The container 22 can move along the top surface 108 of the interlocking mats 50A–50L.

Figure 8:
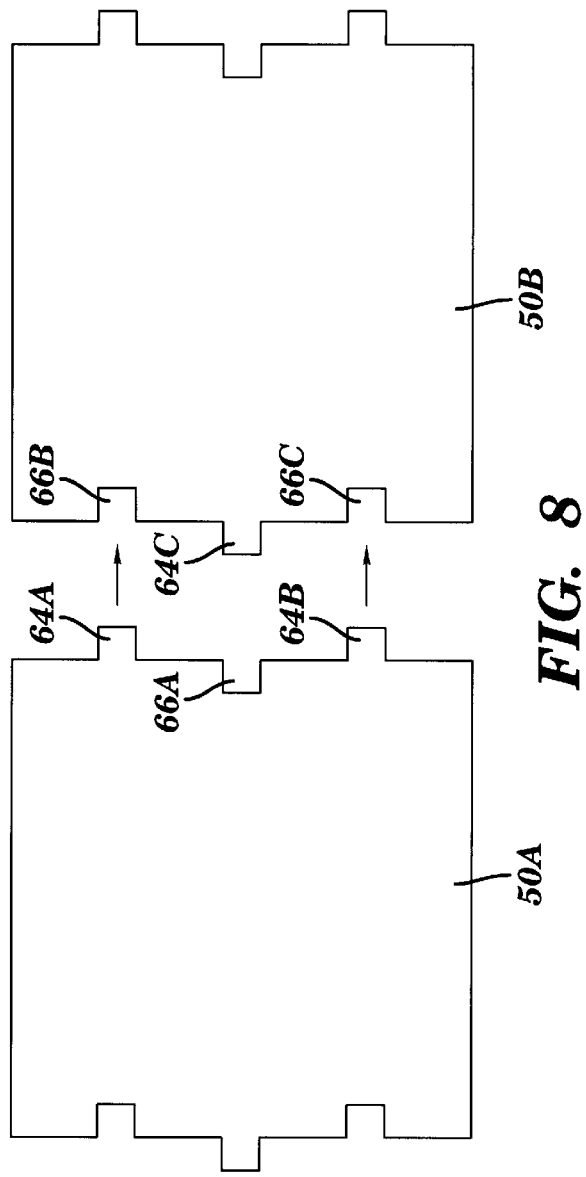
FIG. 8 illustrates a plan view of the interlocking mats.

FIG. 8 illustrates a plan view of the interlocking mats 50A and 50B. The interlocking mat 50A has protruding portions 64A, 64B and a receptive portion 66A. The interlocking mat 50B has a protruding portion 64C and receptive portions 66B and 66C. When the protruding portion 64A is received in the receptive portion 66B, the protruding portion 64B is received in the receptive portion 66C, and the protruding portion 64C is received in the receptive portion 66A, the interlocking mat 50A and interlocking mat 50B are connected. In a similar manner, additional interlocking mats 50 may be added to form a desired total length of support structure 26.

Figure 9:
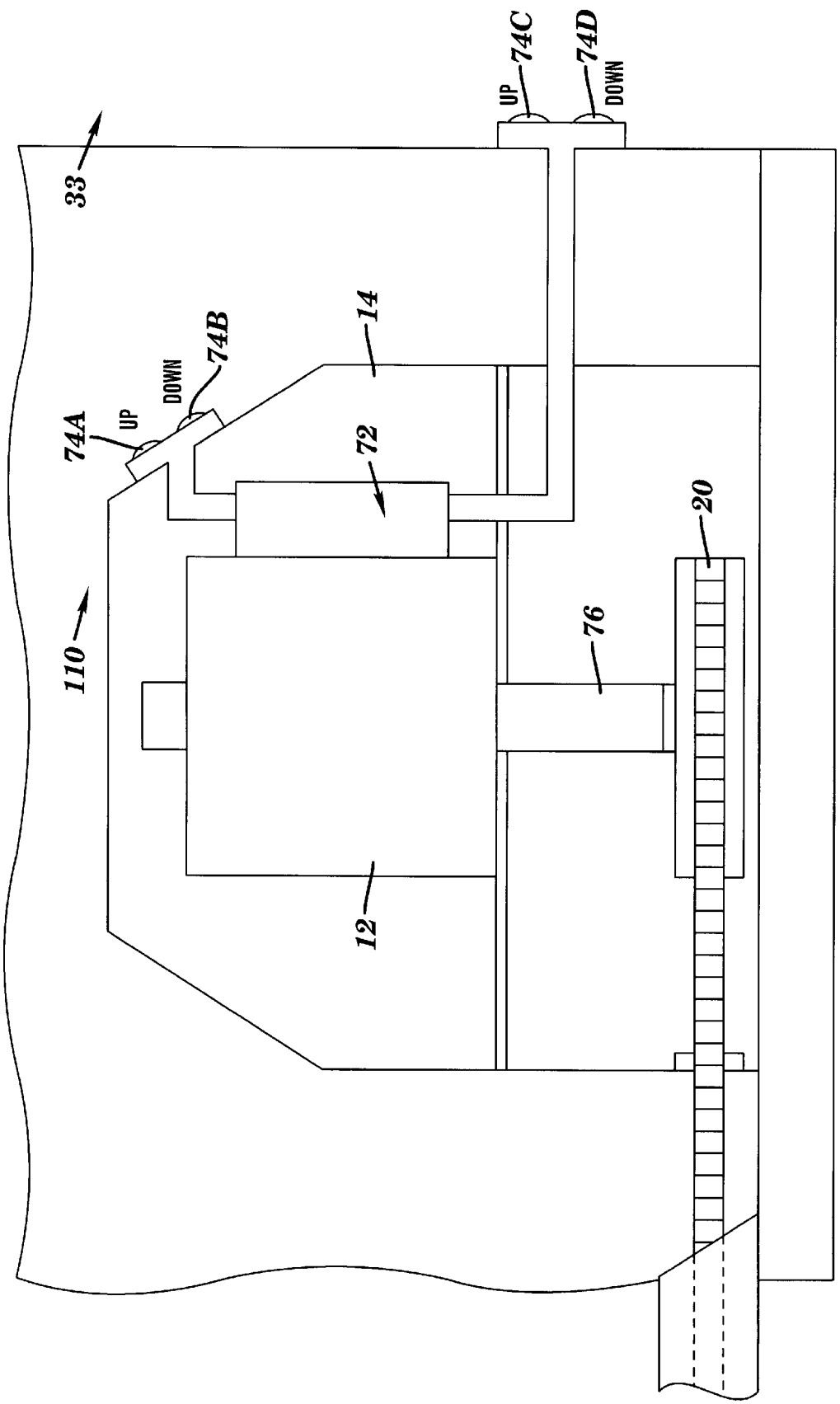
FIG. 9 illustrates a partial cross-sectional view of another embodiment of the first end of the conveying system.

FIG. 9 illustrates a partial cross-sectional view of another embodiment of a first end 110 of a conveying system 17. The motor 12 is placed in the motor housing 14. A shaft 76 connects the motor 12 with the rotary drive pulley 16. The endless flexible conveyor 20 passes around the rotary drive pulley 16. The endless flexible conveyor 20 can be a cable (e.g., wire rope, etc.). Another embodiment of a control system 72 is connected to the motor 12. The control system 72 includes a plurality of control buttons 74A, 74B, 74C and 74D. The function of the control buttons 74 is similar to that of the remote control buttons 60 and 62 in the remote control unit 24 (FIG. 6). For example, an operator can control the direction of the container 22 movement by pressing the "up" control button 74A or 74C, or by pressing the "down" control button 74B or 74D. As illustrated in FIG. 9, for the convenience of the operator, control buttons 74A and 74B are mounted on the motor housing 14, and the control buttons 74C and 74D are mounted inside the house 33.

Figure 10:
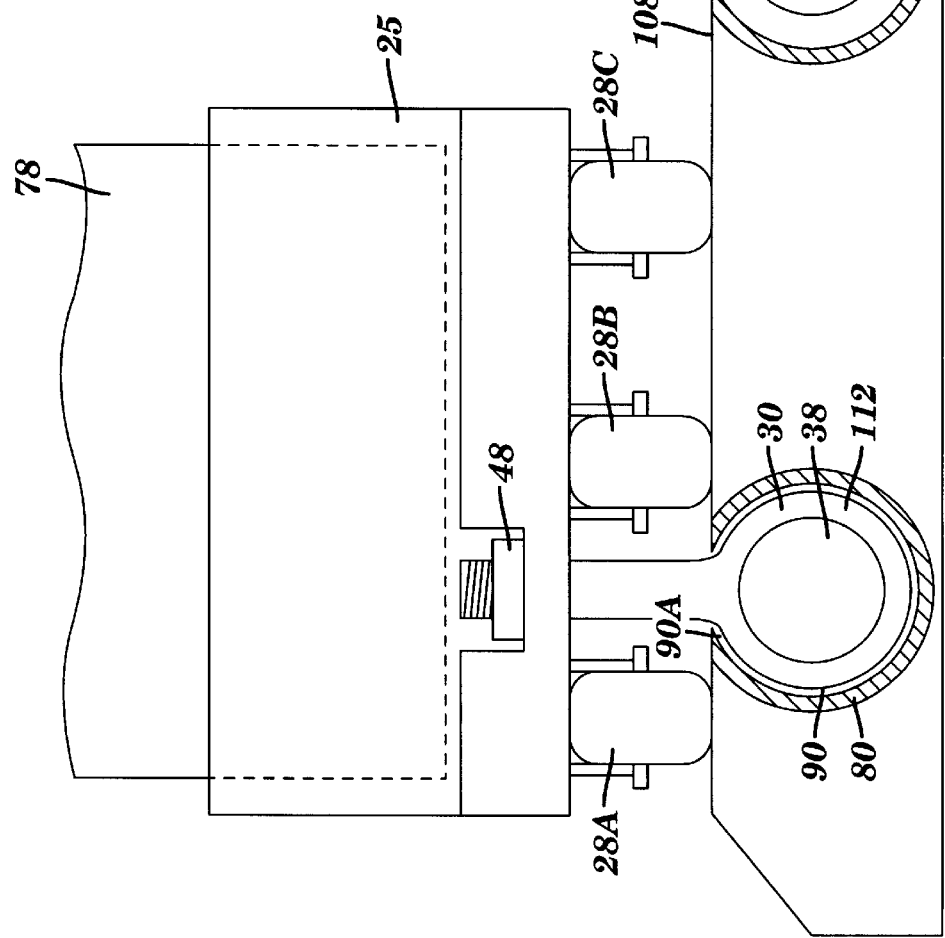
FIG. 10 illustrates a cross-sectional view of another embodiment of the container resting on a surface of the support structure.

FIG. 10 illustrates a cross-sectional view of another embodiment of a container 25 resting on the support structure 26. FIG. 10 illustrates the support structure 26, a first opening 90, a second opening 92, a first layer of rigid material 80, a second layer of rigid layer 82, the first portion of the endless flexible conveyor 38, the second portion of the endless flexible conveyor 42, the connector post 30, the quick release coupling 48, the container 25, the wheels 28A, 28B, 28C, and a garbage bin 78. The support structure 26 has the first layer of rigid material 80 in the first opening 90 receiving the first portion 38 of the endless flexible conveyor 20 and a first end 112 of the connector post 30. The support structure 26 also includes the second layer of rigid material 82 in the second opening 92 receiving the second portion 40 of the endless flexible conveyor 20. Longitudinal slot openings 90A and 90B are located in the top surface 108 of the support structure 26. The container 22 is removably attached to the connector post 30 by the quick release coupling 48 including, for example, a threaded connector. The garbage bin 78 is removably placed in the container 22 and moves along with the container 22.

Figure 11:
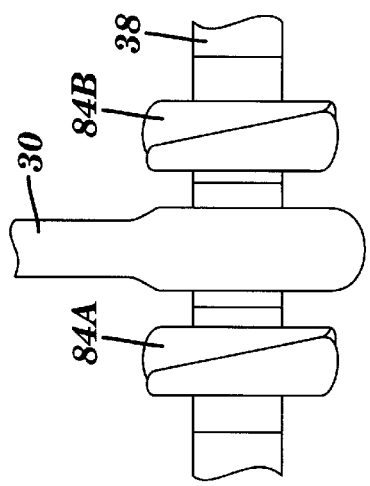
FIG. 11 illustrates a side view of another embodiment of the connector post attached to the endless flexible conveyor.

FIG. 11 illustrates a side view of the connector post 30 attaching to the first portion 38 of the endless flexible conveyor 20. FIG. 11 illustrates the connector post 30, the endless flexible conveyor 20, a first clip 84A and a second clip 84B. The first clip 84A and the second clip 84B may include knots in the endless flexible conveyor 20, positioning the connector post 30 to a fixed location on the endless flexible conveyor 20.

Figure 12:
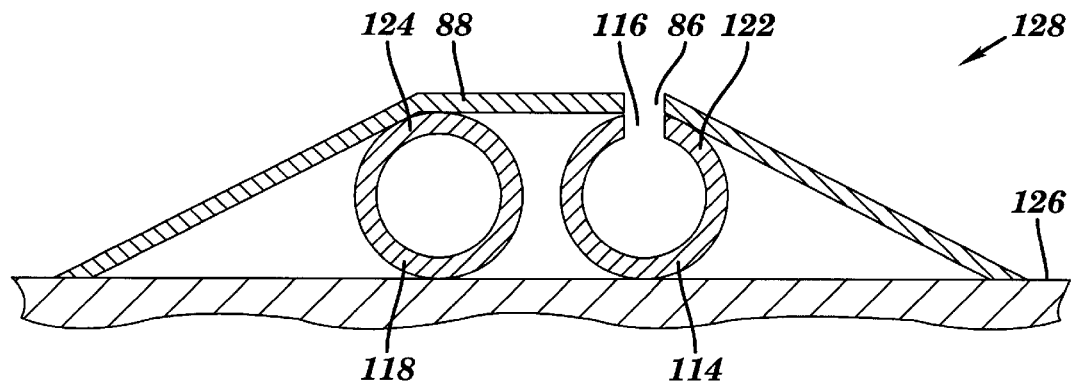
FIG. 12 illustrates a cross-sectional view of another embodiment of the support structure.

FIG. 12 illustrates a cross-sectional view of another embodiment of a support structure 128. The support structure 128 includes a first conduit 114 including a longitudinal slot 116, a second conduit 118 and a platform 88 including a longitudinal slot opening 86. The platform 88 with a longitudinal slot opening 86 is attached to an upper portion 122 of the first conduit 114. The longitudinal slot longitudinal slot 116 of the first conduit 114 is aligned with the longitudinal slot opening 86 in the platform 88. Thus, the connector post 30 (not shown) can move along the longitudinal slot 116 of the first conduit 114 and the longitudinal slot opening 86. An upper portion 124 of the second conduit 118 is attached to the platform 88. As illustrated in FIG. 12, the platform 88, and the conduits 114 and 118 rest on the ground surface 126. Furthermore, the support structure 128 may be formed as a single molded unit from (e.g., plastic, polyester resin, etc.).

Figure 13:
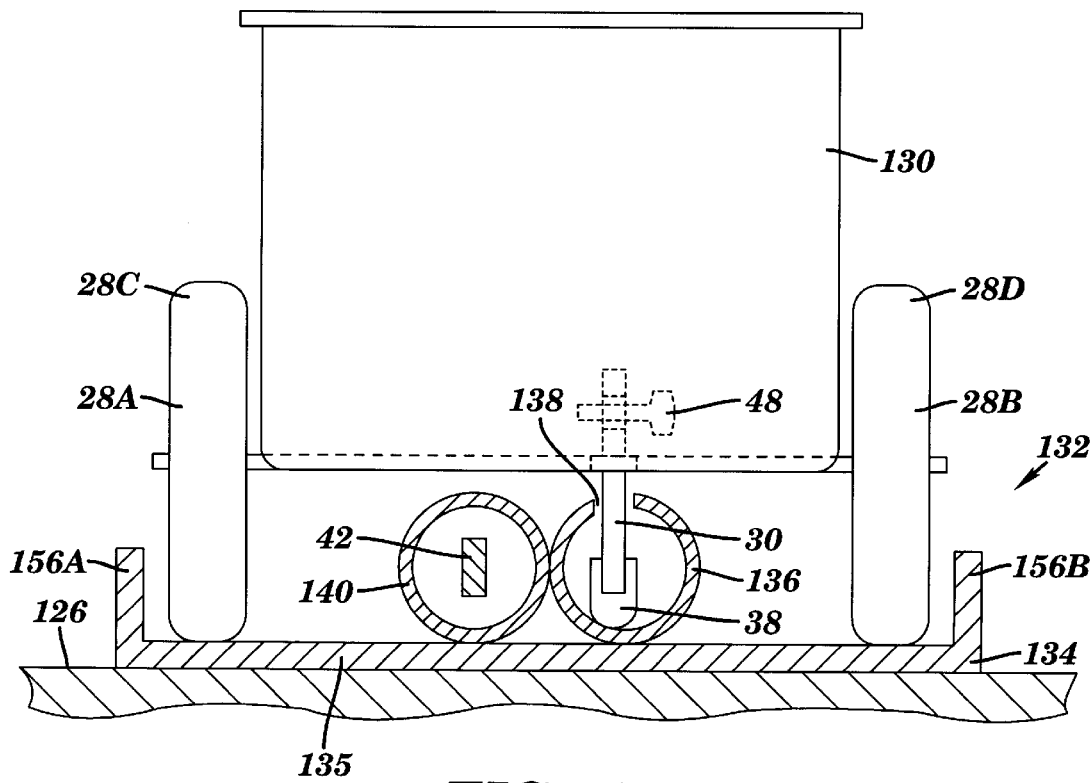
FIG. 13 illustrates a cross-sectional view of another embodiment of the container resting on the support structure.

FIG. 13 illustrates a cross-sectional view of another embodiment of the container 130 resting on a support structure 132. The support structure 132 includes a platform 134, a first conduit 136 including a longitudinal slot 138, and a second conduit 140.

The first conduit 136 and the second conduit 140 are attached to the platform 134. The platform 134 includes a lower portion 135, a side wall 156A, and a side wall 156B. The lower portion 135 of the platform 134 rests on the ground surface 126. The support structure 132 may be formed as a single molded unit from (e.g., plastic, polyester resin, etc.). The container 130 is attached to the connector post 30 with a quick release coupling 48. The quick release coupling 48 can include, for example, a cotter pin, clamp or any other suitable connector. The container 130 includes wheels 28A, 28B, 28C and 28D that roll on the platform 134. The side walls 156A and 156B guide the wheels 28A, 28B, 28C, and 28D.

The foregoing description of the present invention has been presented for purposes of illustration and description. It is not intended to be exhaustive or to limit the invention to the precise form disclosed, and many modifications and variations are possible in light of the above teaching. For example, the conveying system can transport not only trash or garbage but other objects such as newspapers, mail, groceries, etc. Such modifications and variations that may be apparent to a person skilled in the art are intended to be included within the scope of this invention as defined by the accompanying claims.

I claim:

1. An apparatus comprising:
    a motor;
    a rotary drive pulley operatively coupled to the motor;
    a support structure having a first end attached to the motor and a second end attached to an idler member, wherein the support structure includes a plurality of interconnecting sections;
    an endless flexible conveyor connecting the rotary drive pulley and the idler member;
    a first end of a connector post connected to the endless flexible conveyor;
    a container for carrying objects removably attached to a second end of the connector post; and
    a wireless remote control system for activating the motor.

2. The apparatus of claim 1 further including a regulating system for providing at least two distance limits for the motion of the container.

3. The apparatus of claim 1, wherein the endless flexible conveyor is a cable.

4. The apparatus of claim 1, wherein the endless flexible conveyor is a positive drive belt.

5. The apparatus of claim 1, wherein the first end of the support structure is located near a building and the second end of the support structure is located near a road.

6. The apparatus of claim 1, wherein the interconnecting sections further include a plurality of interlocking mats, with a first longitudinal opening receiving a first portion of the endless flexible conveyor within each mat, and a second longitudinal opening receiving a second portion of the endless flexible conveyor within each mat.

7. The apparatus of claim 6, wherein the support structure further includes a first layer of rigid material in the first opening of the mats and a second layer of rigid material in the second opening of the mats.

8. The apparatus of claim 6, wherein the interlocking mats are rubber.

9. The apparatus of claim 1, wherein the interconnecting sections further include a first conduit having a longitudinal slot for receiving the first portion of the endless flexible conveyor and the connector post, and a second conduit receiving the second portion of the endless flexible conveyor.

10. The apparatus of claim 9, wherein the support structure further includes a platform attached to an upper portion of each conduit.

11. The apparatus of claim 10, wherein the platform further includes an longitudinal opening aligned with the longitudinal slot of the first conduit.

12. The apparatus of claim 9, wherein the support structure further includes a platform attached to a lower portion of each conduits.

13. The apparatus of claim 9, wherein the conduits further include a plurality of interconnected pipe sections.

14. The apparatus of claim 1, wherein the container further includes a plurality of wheels for rolling along a surface of the support structure.

15. The apparatus of claim 1, wherein the wireless remote control system can turn the motor on or off.

16. The apparatus of claim 1, wherein the wireless remote control system can reverse a direction of the motor.

17. The apparatus of claim 1 further including a trash receptacle removably placed in the container.

18. An apparatus comprising:
    a motor;
    a rotary drive pulley operatively coupled to the motor;
    an endless flexible conveyor connecting the rotary drive pulley and an idler member;
    a support structure having a first end attached to the motor and a second end attached to the idler member, wherein the support structure further includes a plurality of interlocking mats, with a first longitudinal opening receiving a first portion of the endless flexible conveyor within each mat, and a second longitudinal opening receiving a second portion of the endless flexible conveyor within each mat;
    a first end of a connector post connected to the endless flexible conveyor; and
    a container for carrying objects removably attached to a second end of the connector post.

19. The apparatus of claim 18, further comprising a regulating system for providing at least two distance limits for the motion of the container.

20. An apparatus comprising:
    a motor;
    a rotary drive pulley operatively coupled to the motor;
    a support structure having a first end attached to the motor and a second end attached to an idler member, wherein the support structure includes a plurality of interconnecting sections;
    an endless flexible conveyor connecting the rotary drive pulley and the idler member; and
    a connector post having a first end connected to the endless flexible conveyor and a second end including a quick release coupling.

21. The apparatus of claim 20, further including a container for carrying objects removably attached to the second end of the connector post by the quick release coupling.

22. The apparatus of claim 20, further including a regulating system for providing at least two distance limits for the motion of the container.

* * * * *